(12) United States Patent
Kerenyi

(10) Patent No.: US 6,667,583 B2
(45) Date of Patent: Dec. 23, 2003

(54) METHOD AND APPARATUS FOR EFFICIENTLY DRIVING A LOW-VOLTAGE DEVICE FROM A WIDE-RANGE INPUT SUPPLY

(75) Inventor: Ladislas G. Kerenyi, White Plains, NY (US)

(73) Assignee: Supertex, Inc., Sunnyvale, CA (US)

( * ) Notice: Subject to any disclaimer, the term of this patent is extended or adjusted under 35 U.S.C. 154(b) by 0 days.

(21) Appl. No.: 10/141,051

(22) Filed: May 7, 2002

(65) Prior Publication Data

US 2003/0209994 A1 Nov. 13, 2003

(51) Int. Cl.$^7$ ............................................. H05B 37/02
(52) U.S. Cl. ...................... 315/219; 315/225; 315/224; 315/243; 315/272; 315/307
(58) Field of Search .................... 315/291, 219, 315/307, 224, 225, 243, 272; 323/222, 267, 282, 285, 902

(56) References Cited

U.S. PATENT DOCUMENTS 4,673,865 A * 6/1987 DeLuca et al. ............ 323/222
5,235,255 A * 8/1993 Blom ......................... 315/224
5,369,340 A * 11/1994 Leyten ....................... 315/307
6,396,718 B1 * 5/2002 Ng et al. .................. 363/21.07

* cited by examiner

Primary Examiner—Haissa Philogene
(74) Attorney, Agent, or Firm—Jeffrey Moy; Harry M. Weiss; Weiss, Moy & Harris, P.C.

(57) ABSTRACT

A method an apparatus for efficiently driving a low-voltage device from a wide-range input supply uses and inductor and a diode coupled in parallel to provide a high-efficiency energy storage circuit. The parallel diode/inductor circuit is coupled to a switch for intermittently supplying a current to maintain a level of energy storage in the circuit. The switch is coupled to a control circuit for controlling the switch. The external device be a relay and the inductor may be a coil of the relay. The external device may be one or more LEDs connected in series and the diode may be the series LED circuit. The control circuit may include a fault-tolerant synchronization input for connection to multiple driver circuits, whereby audible noise produced by beat frequencies between the relays is eliminated.

33 Claims, 5 Drawing Sheets

Fig. 5

METHOD AND APPARATUS FOR EFFICIENTLY DRIVING A LOW-VOLTAGE DEVICE FROM A WIDE-RANGE INPUT SUPPLY

BACKGROUND OF THE INVENTION

1. Field of the Invention

The present invention relates generally to driver integrated circuits, and more specifically, to a circuit for driving relays, light-emitting diodes (LED), or other low-voltage devices efficiently from a wide supply voltage range.

2. Background of the Invention

Relay drivers, lamp drivers and LED driver integrated circuits (ICs) are in common use for supplying a drive current or voltage to the above devices connected externally to an IC driver. Typically the IC requires a supply voltage in accordance with the drive voltage requirements of the external device, or comprises an open-collector/open-drain driver that provides a return path for a power supply connection made directly to the external device.

If a power supply in accordance with the requirements of the external device are not readily available, a higher supply voltage can be reduced by resistive dissipation, producing a low-cost but inefficient solution, or a lower or higher supply voltage can be adapted via a dedicated power converter, providing a more efficient, but higher-cost solution. When only a few external devices such as relays, LEDs or lamps are driven by one or more driver ICs, a dedicated power converter is typically not cost-justified. Also, when the power supply input can vary widely or may be powered from differing sources such as batteries, line voltage or rectified AC (such as in automotive, telecommunications, industrial control or home appliance applications), the above-described solutions may not be practical.

Further, when driving relays, the current required to maintain a state of the relay (hold-in current) is much less than the current required to switch the relay (pull-in current). Since the supplied current is generally determined by the voltage applied across the relay coil terminals, the typical solutions described above are further inefficient in that the current supplied to the relay coil over long periods of hold-in time is much greater than the minimum current required by the relay.

Last, when driving relays from a switching power supply converter, frequencies higher than 20 Khz (the upper range of human hearing) are typically used to avoid audible electromechanical noise from emanating from the relays. However, multiple relay installations using a separate power supply circuit for each relay can produce beat frequencies through mechanical mounting structures coupling the relays (such as printed circuit boards or chassis) producing audible mechanical noise.

Therefore, it would be desirable to provide an apparatus and method for driving low-voltage devices such as relays, lamps or LEDs efficiently from a wide range of power supply input voltages. It would further be desirable to provide a relay driver circuit that reduces or eliminates beat frequency mechanical noise in a multiple relay circuit.

SUMMARY OF THE INVENTION

The above objectives are achieved in a circuit for driving a low-voltage device from a widely varying input supply. The driver circuit comprises an inductor (which may be a relay coil) connected in parallel with a diode (which may be one or more LEDs coupled in series) a switch coupled to a common connection of the diode and the inductor, and a control circuit coupled to the control input of the switch for intermittently applying a current to the inductor whereby an energy level of the inductor/diode circuit is maintained during an activation period. The circuit may comprise multiple driver circuits having a synchronization input coupled to a common connection whereby a switching action of the multiple driver circuits is synchronized to avoid beat frequency mechanical noise from being generated between the low-voltage devices.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

Figure 1:
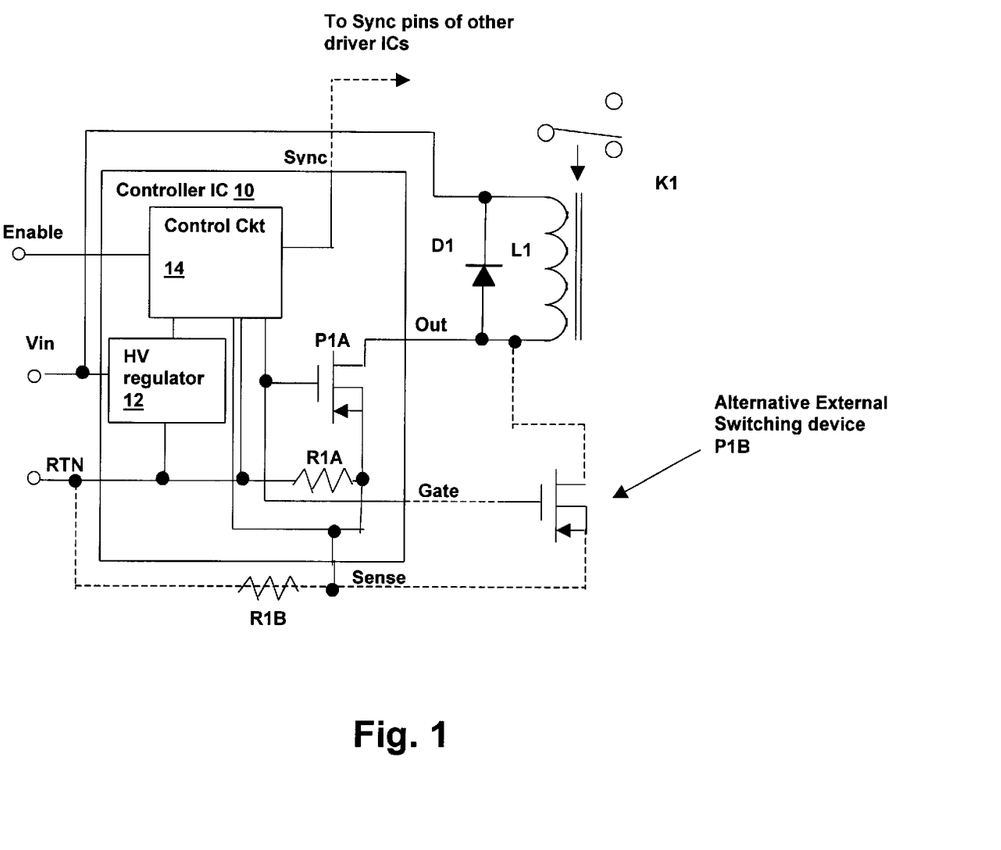
FIG. 1 is a schematic diagram depicting a relay driver circuit in accordance with an embodiment of the invention.

Referring now to the figures and in particular to FIG. 1, a relay driver circuit in accordance with an embodiment of the invention is depicted. A controller integrated circuit 10 (IC) is connected to a power source Vin, that may vary over a wide range of voltages (e.g., 8VDC to 400VDC or unfiltered rectified AC voltage of equivalent ranges). A high voltage regulator 12 provides operating power for internal blocks within controller IC 10 and is designed to withstand the range of Vin supplied. An output terminal Out is coupled to a parallel combination of an inductor L1 (which is a relay coil of relay K1) and a diode D1, or alternatively is coupled to a gate of an external transistor P1B. (When an external transistor implementation is provided, the optional gate terminal effectively replaces the Out terminal.)

The parallel combination of inductor L1 and diode D1 is also coupled to the power supply appearing at the Vin terminal. When switching transistor P1A (or alternatively external transistor P1B) is activated, a current is supplied to inductor L1 and diode D1 is reverse-biased. When the switching circuit is de-activated, the current through inductor L1 continues through diode D1 and but for losses in the circuit due to the forward voltage drop of diode D1, winding resistance of inductor L1 and magnetic losses), the current would continue indefinitely. Since diode D1 has a finite voltage drop, the terminal voltage of inductor L1 will have an essentially fixed voltage, therefore producing an essentially linear decay in the current through inductor L1. By intermittently pulsing the switching circuit (transistor P1A or transistor P1B) energy storage within inductor L1 can be maintained at a substantially constant average level or equivalently maintaining a substantially constant average current through inductor L1, since the stored energy in the inductor is $LI^2/2$, where L is the inductance of inductor L1 and I is the current through inductor L1. Diode D1 also serves as a back-emf diode for inductor L1 as is generally found in driver circuits. A back-emf is generated when the current supplied to an inductor is suddenly interrupted and back-emf diodes are supplied to dissipate the energy in an inductor so that a large voltage spike is not generated by the interruption of current. In contrast to the typical application of a back-emf diode, diode D1 in the present invention provides a means for maintaining the current level in inductor L1.

The current controlling action of controller IC 10 may be extended to provide multiple levels of current set by a control circuit 14, as will be described below. For example, in a relay driver circuit, a pull-in current may be applied initially to set the relay and a lower value hold-in current applied after an initial time period has elapsed for efficient operation. Also, as solenoid operation is similar, the relay driver circuits of the present invention are applicable to solenoid driver circuits. All references to relays should therefore be understood to include solenoids.

Control circuit 14 is coupled to the gate of transistor P1A (or alternatively to the gate terminal for controlling external device P1B) to control the switching circuit. A resistor R1A (or alternatively an external resistor R1B) is connected in series with the switching circuit to provide a voltage proportional to the current applied through inductor L1. Alternatively, a sensing circuit may be formed using a sense transistor connected in a mirror configuration with the switching transistor or a measurement may be made of the voltage at the drain terminal of the switching transistor, although the variation with temperature of the $R_{ds}$ of the switching transistor will generally make it desirable to sense current using either a separate sense resistor or transistor.

Control circuit 14 includes a pulse-width modulator that produces a pulse for activating the switching circuit for the time interval required to maintain the level of average energy stored in inductor L1. Control circuit 14 also includes an external synchronization input Sync for synchronizing multiple controller Ics 10, whereby mechanical noise caused by beat frequencies between relays driven by separate controller ICs is eliminated. An Enable input may be provided to control the output of control circuit 14 turning off the charging action of the switching circuit in order to deactivate relay K1.

Thus, an integrated circuit controller is provided by the present invention that has a minimum number of terminals, requires no low voltage power supply and can efficiently supply a current to a low voltage device such as a relay. A two-terminal circuit may actually be devised in which the voltage Vin is received by the high-voltage regulator from the Out terminal during the time in which the switching circuit is inactive (so that the power supply for the controller IC is supplied through the inductor which is connected to the high-voltage power supply). Thus the two-terminal configuration only requires an Out terminal and a RTN terminal if internal transistor P1A and internal sense resistor R1A are used. The two-terminal application is practical when the IC controller is used only to maintain the current in the inductor (for example in an application where a push-button switch is used to activate a relay) or as a two-terminal addition to a microcontroller or other circuit where the relay enable input is already available. A three-terminal device can provide a separate enable input, thus providing the functionality as described above without the synchronization feature.

Figure 2A:
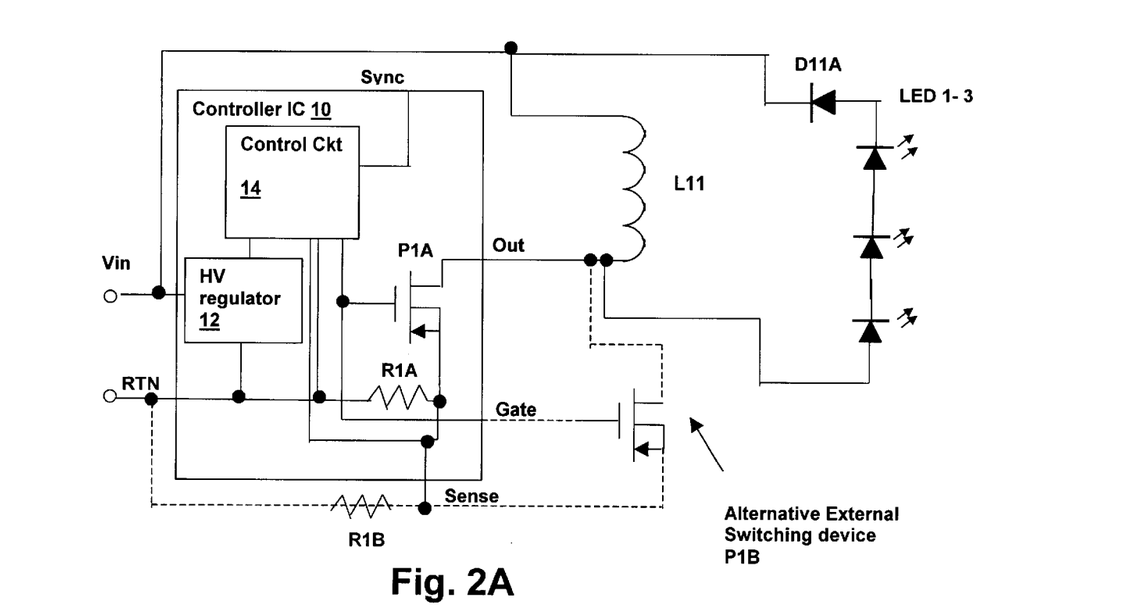
FIG. 2A is a schematic diagram of an LED driver circuit controller in accordance with an embodiment of the invention.

Referring now to FIG. 2A, an LED driver circuit in accordance with an embodiment of the invention is depicted. Most of the operation of the circuit of FIG. 2A is identical to the operation of the circuit of FIG. 1, so only differences between the circuits will be described below. Output terminal Out is coupled to a parallel combination of an inductor L11 and a series diode circuit comprising diode D11A and LEDs LED1–3. While the illustrated embodiment depicts three LEDs connected in series, this is not a limitation of the present invention and any number of LEDs may be driven in accordance with embodiments of the present invention. Alternatively, as above, IC controller 10 may have a gate terminal coupled to a gate of external transistor P1B.)

The parallel combination of inductor L11 and the series diode circuit is also coupled to the power supply appearing at the Vin terminal. When switching transistor P1A (or alternatively external transistor P1B) is activated, a current is supplied to inductor L11 and the diode circuit is reverse-biased. Diode D11A is supplied to prevent reverse breakdown of LED 1–3, as LEDs typically can withstand only low reverse voltages (typically 6V) and thus when the Vin is a high voltage (such as 400V), the reverse voltage applied across the series diode circuit would cause reverse breakdown of LED 1–3 without the presence of diode D11A which should have a $V_{br}$ sufficient to withstand the maximum voltage expected at Vin.

When the switching circuit is de-activated, the current through inductor L11 continues through the series diode circuit comprising diode D11A and LED 1–3 which will have a much larger forward voltage drop than the circuit illustrated in FIG. 1, but the size of inductor L11 is chosen to produce sufficient current through LED1–3 to illuminate the LEDs in this portion of the cycle. In general, for very high supply voltages, the pulse width controlling the switching circuit will be very narrow, providing a very long period of LED activation. The frequency of the switching circuit (generally 20 Khz or above) will also be much higher than the frequency at which visible variation can occur in LEDs (typically 30 Hz or below) so no variation in illumination will be noticeable using the above-described circuit. The circuit of FIG. 2A takes advantage of the conduction through the diode circuit of the present invention during the period in which the switching circuit is inactive, which is generally suitable for diode loads such as LEDs. The Sync input is generally not needed when driving LED loads, as they generally do not generate electromechanical noise, but synchronization may still be useful in applications where electromagnetic interference must be controlled (such as telecommunications applications where power supplies are typically tuned to particular frequencies to avoid in-band interference from harmonics).

Figure 2B:
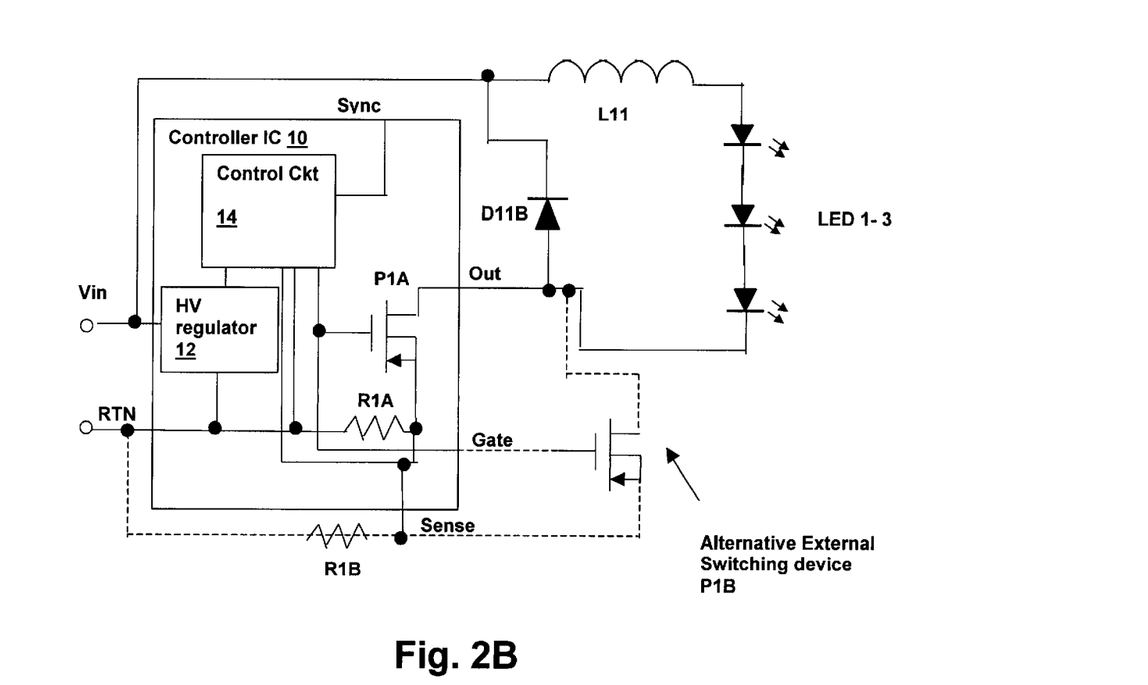
FIG. 2B is a schematic diagram of an LED driver circuit controller in accordance with an alternative embodiment of the invention.

Referring now to FIG. 2B, an LED driver circuit in accordance with another embodiment of the invention is depicted. Most of the operation of the circuit of FIG. 2B is identical to the operation of the circuits of FIGS. 1 and 2A, so only differences between the circuits will be described below. The circuit of FIG. 2B provides current to an external device comprising a series LED circuit LED1–3 continuously (In contrast to the circuit of FIG. 2A, where the current was supplied only during the "off" period of the switching circuit).

Inductor L11 is connected in series with the external device (LED1–3) and the series connected circuit is coupled in parallel to a diode D11B. The Out pin (or alternatively external switching device P1B) is coupled to one side of the parallel combination of diode D11B and the series connected external device (LED1–3) and inductor L11. The other terminal of the parallel combination of inductor L11 and diode D11B circuit is coupled to the power supply appearing at the Vin terminal. When switching transistor P1A (or alternatively external transistor P1B) is activated, a current is supplied to LED1–3 through inductor L11, diode D11B is reverse-biased. When the switching circuit is de-activated, the current through inductor L11 continues through diode D11B. The circuit of FIG. 2B is generally useful for driving non-relay loads that do not incorporate an inductor such as the LEDs illustrated, lamps or other devices. The circuit of FIG. 2B is also useful for driving devices from higher voltage supplies, since the voltage drop of the external device appears in series with the inductor, while FIG. 2A is a circuit more suitable for lower voltage applications, as the entire supply voltage (less the voltage drop of the switching circuit) is available for charging the inductor.

Figure 3:
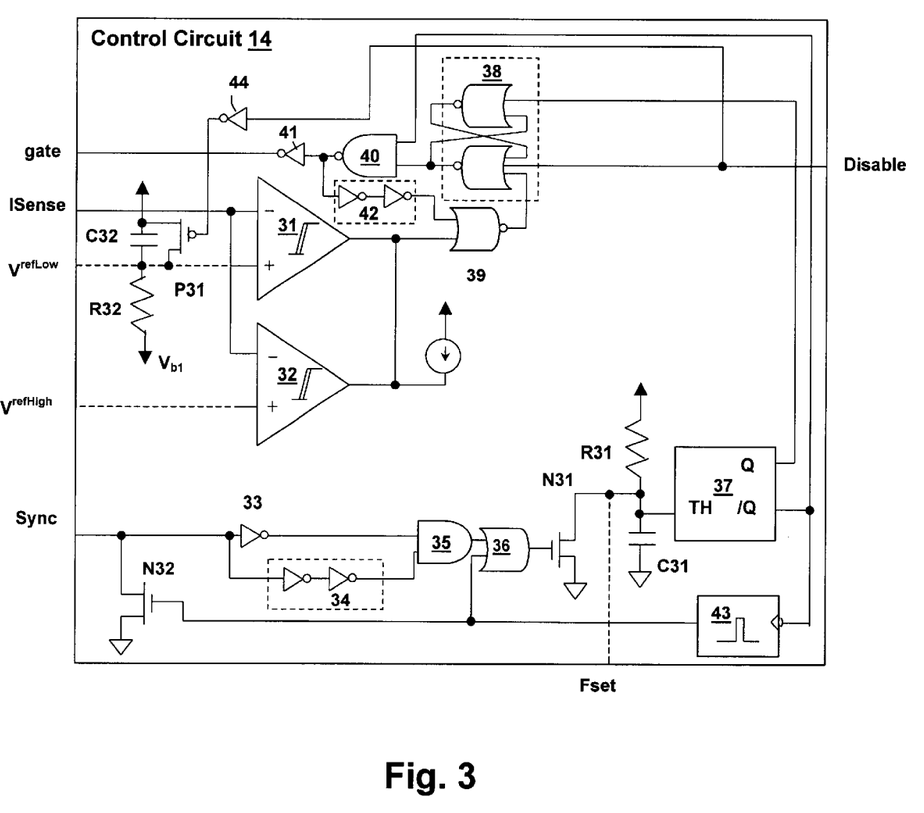
FIG. 3 is a schematic diagram of control circuit 14 of FIGS. 1, 2A and 2B.

Referring now to FIG. 3, details of control circuit 14 of FIGS. 1, 2A and 2B are illustrated. Sense terminal is connected to a first comparator 31 and a second comparator 32 for determining a first and second pulse width of a pulse-width modulator formed by oscillator 37 and flip-flop 38. The two level pulse-width configuration is generally applicable to relay driver circuits such as the circuit of FIG. 1 and circuits for driving LEDs, lamps or other external devices may only use a single comparator for setting a pulse width. The two levels determined by comparators 31 and 32 are used to produce a pull-in current level and a hold-in current level for efficiently driving a relay. Reference voltages $V^{refLow}$ and $V^{refHigh}$ are shown on the boundary of control circuit 14 and may be provided to pins external to controller IC 10 for external programming of current levels or may be set by voltage references within controller IC 10. Additionally, startup circuitry and other functions such as the enable input may be used to control the reference voltages to enable/disable the pulse-width modulator output.

Oscillator 37 is optionally synchronized with external circuitry such as an external crystal oscillator or to other controller ICs 10 by a signal input at the Sync terminal. A negative edge detector is provided by AND gate 35, inverter 33 and delay 34 that produce a positive pulse to activate transistor N31 through an OR gate 36 when the Sync pin undergoes a negative transition. Transistor N31 discharges a ramp capacitor C31 that is charged through resistor R31 (or alternatively a current source) that may be provided external to controller IC 10 (via terminal Fset) to provide programming of oscillator 37 frequency. Transistor N32 is connected in an open-drain configuration to the Sync terminal and has a gate coupled to a one-shot 43 having an input coupled to the inverted output of oscillator 37. When the negative transition occurs on the inverted output of oscillator 37, transistor N32 is momentarily activated by one-shot 43, pulling the Sync terminal low. If the negative transition on the inverted output of oscillator 37 occurs before a negative transition is seen at the Sync terminal from an external device, the activation of transistor N32 will cause the switching of oscillator 37 to override any input from an external device, and also pull down the Sync terminal to synchronize external devices. (If an external crystal oscillator is connected to the Sync terminal, it should therefore have a higher operating frequency than the maximum possible oscillating frequency of oscillator 37.) Oscillator 37 will be restarted due to discharge of capacitor C31 when the output of one-shot 43 activates transistor N31 through OR gate 36. The pulse width of one-shot is sufficiently long that the switching of transistor N32 does not cause a second pulse to appear at the gate of transistor N31 after propagation through logic circuits 33, 34 35 and 36.

The above-described oscillator is fault-tolerant, in that if the Sync terminal becomes shorted, if an external oscillator fails, or if the logic circuits coupling the Sync terminal to oscillator 37 fail, oscillator 37 will still operate at its natural operating frequency. Thus, Sync is a bi-directional signal that may be used to synchronize multiple connected IC controllers 10 and each IC controller 10 exhibits fault-tolerant operation with respect to the Sync terminal signal. The controller having the highest natural operating frequency will cause all of the other IC controllers 10 to synchronize to that frequency. When an external oscillator such as a crystal oscillator is connected to the Sync terminal, the frequency of the external oscillator should be higher than the highest expected natural operating frequency of any of the oscillators 37.

The outputs of oscillator 37 are further used to set flip-flop 38. Flip-flop 38 generates the pulse-width modulator output and is supplied to the gate terminal (or gate of a switching device internal to IC controller 10) via AND gate 40 and inverter 41. NOR gate 39 resets flip-flop 38 when comparator 31 or comparator 32 is activated, terminating the pulse output, but only after delay 42 has expired if the output of AND gate 40 has just transitioned, avoiding the production of very narrow pulses at the output of the pulse-width modulator when a current level is exceeded at the very beginning of a pulse.

Comparator 31 is coupled to an RC timing circuit formed by resistor R32 and capacitor C32 and coupled to a transistor P31. When control circuit 14 is disabled, transistor P31 is activated via an inverter 44, thus discharging capacitor C32. When the disable input is deactivated (i.e., when the driver is enabled) transistor P31 is deactivated, permitting C32 to charge through resistor R32. Thus, the action of comparator 31 is suppressed until a time period has elapsed after the control circuit 14 is enabled. This permits comparator 32 to initially control the pulse-width modulator output and is generally used to set the pull-in current level for a relay driver. Comparator 31 begins to trip after capacitor C32 has sufficiently charged and resets flip-flop progressively earlier (thus producing progressively shorter pulses) as capacitor C32 continues to charge. Finally, comparator C31 sets the hold-in level that becomes active after capacitor C32 has completely charged and the reference input of comparator C31 has reached voltage $V_{b1}$. Resistor R32 is coupled to a voltage source which may be a resistive divider coupled to the positive power supply rail, so that the minimum current level is a value greater than zero.

Figure 4:
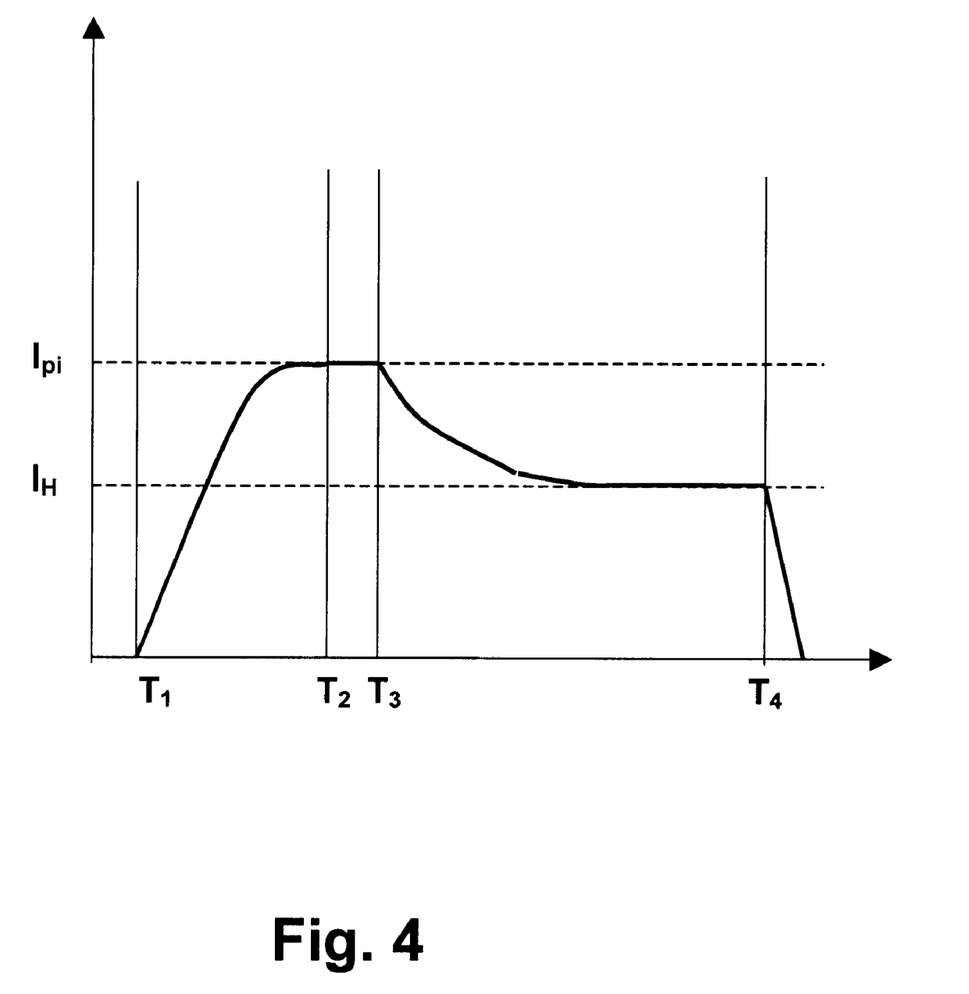
FIG. 4 is a graph illustrating operation of a relay driver circuit in accordance with an embodiment of the invention.

Referring now to FIG. 4, operation of a relay driver circuit in accordance with an embodiment of the present invention is illustrated in a graph showing coil current vs. time. At time $T_1$ the control circuit is enabled and the inductor current rises as the pulse width modulator enables the switching circuit by setting flip-flop 38. At time $T_2$, the pull-in current $I_{pi}$ is reached, and comparator 32 turns off the switching circuit. The above-described action maintains the pull-in current at the set point determined by $V_{refHigh}$. At time $T_3$, capacitor C32 has charged, permitting comparator 31 to control deactivation of the switching circuit. Comparator 31 thus controls the pulse width, letting the current level fall to the hold-in level $I_H$, and then maintains that level until time $T_4$, when control circuit 14 is disabled (via the Disable signal) and the current falls to zero.

Figure 5:
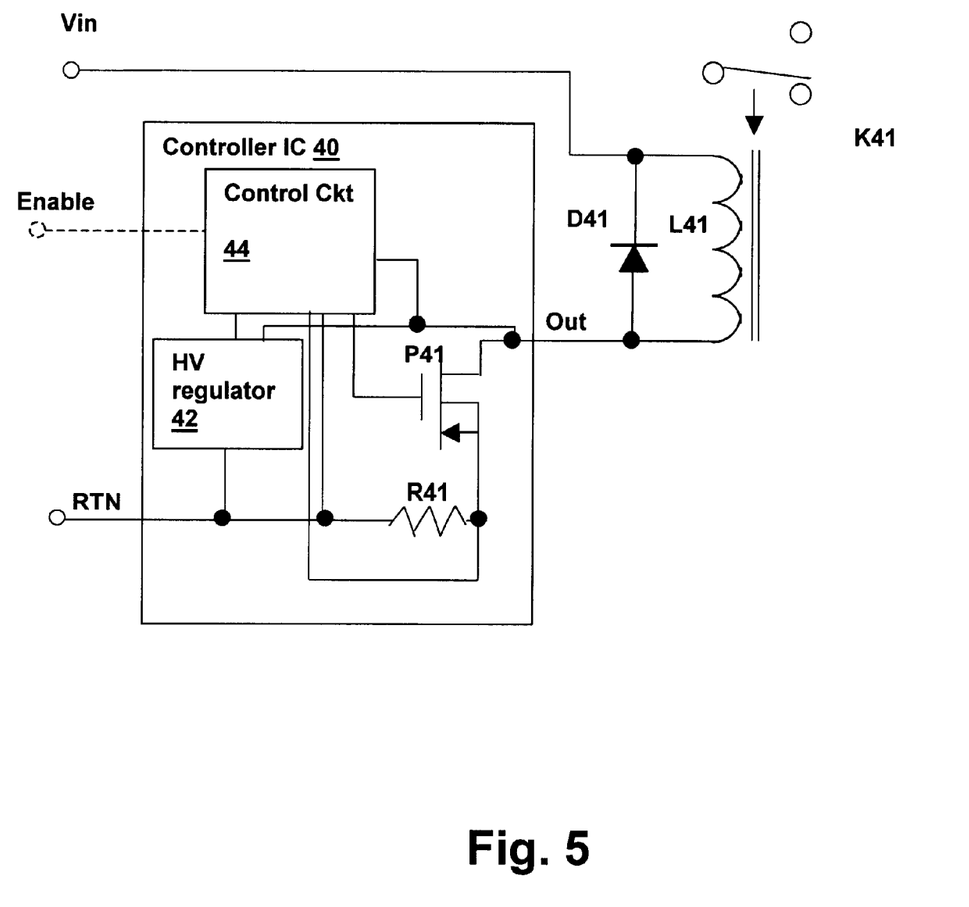
FIG. 5 is a schematic diagram depicting a relay driver circuit in accordance with another embodiment of the invention.

Referring now to FIG. 5, an relay driver circuit in accordance with an embodiment of the invention is depicted. Most of the operation of the circuit of FIG. 5 is identical to the operation of the circuit of FIG. 1, so only differences between the circuits will be described below. The circuit of FIG. 5 is representative of a two-terminal device (with an optional third terminal for enable control) that may be incorporated within an external device, such as a relay. In the depicted circuit, rather than coupling a high voltage regulator 42 to the input power supply, power is derived through the Out terminal by coupling the Out terminal to regulator 42 internally. No external gate, sense or sync terminals are implemented in this package, reducing the pin count. A sense resistor R41 is included for measuring the current applied through switching transistor P41. Out terminal is shown coupled to control circuit 44 for providing protection to controller IC 40 by measuring the voltage at the Out terminal while switching transistor P41 is on. Control circuit 44 can shut down switching action, providing protection against excessive switching current due to misconnection or external circuit failure until power is removed from the circuit.

Control circuit 44 is pre-programmed to provide the desired current level (i.e., level of energy storage within inductor L41) and may implement multiple levels activated via timers within control circuit 44, thus providing a controller IC 40 for a fixed application where external device parameters are known. A third Enable terminal may be added to provide on-off control of the external device, but a controller IC 40 without an enable input may be used to control an external device where the application of voltage at terminal Vin provides such control (i.e., where the external device should be activated any time sufficient voltage is present at terminal Vin and controller IC 40 is used only to control the current supplied to the external device)).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A circuit for supplying a drive current through an external device, comprising:
    a series connected circuit loop comprising said external device, an inductor for storing energy whereby substantially constant predetermined levels of average current are maintained through said external device and a diode circuit for providing unidirectional flow of current through the inductor when said external current is not applied to said inductor;
    a switching circuit for intermittently applying an intermittent current through said inductor for maintaining said substantially constant predetermined levels of average current through said inductor; and
    a control circuit for controlling said switching circuit, whereby said level of energy storage is maintained, and wherein said external device is a relay and wherein said inductor is a coil of said relay, wherein said diode further serves as a back-emf diode for said relay, wherein said series connected circuit loop comprises a parallel connection of said diode circuit and said relay coil, and wherein a first terminal of said parallel connection is coupled to a power supply input and a second terminal of said parallel connection is coupled to said switching circuit.

2. The circuit of claim 1, wherein said diode circuit has a first terminal coupled to a first terminal of said inductor and a second terminal coupled to a first terminal of said external device, said external device has a second terminal coupled to a second terminal of said inductor, and wherein said switching circuit is coupled to said second terminal of said diode circuit, whereby current is maintained through said series connected circuit loop whether or not said switching circuit is applying said external current.

3. The circuit of claim 1, wherein said control circuit has first state for not applying energy to said relay coil, a second state for applying a pull-in level of energy to said relay coil and a third state for applying a hold-in level of energy to said relay coil.

4. The circuit of claim 1, wherein said diode circuit has a first terminal coupled to a first terminal of said inductor and a second terminal coupled to a first terminal of said external device, said external device has a second terminal coupled to a second terminal of said inductor, and wherein said switching circuit is coupled to said second terminal of said inductor, whereby said diode circuit prevents conduction through said external device while said switching circuit is applying said external current.

5. The circuit of claim 1, wherein said control circuit comprises a synchronization input whereby said pulse-width modulator is synchronized with another external control circuit.

6. The circuit of claim 5, wherein said synchronization input is a bi-directional input/output terminal whereby said control circuit provides a synchronization output for synchronizing external driver circuits.

7. The circuit of claim 6, wherein said control circuit further comprises:
    an edge detector having an input coupled to said synchronization input; and
    an oscillator having a reset input coupled to an output of said edge detector, whereby said oscillator is synchronized with an external clock applied to said synchronization input, and wherein said oscillator will run independent of a fault state of said synchronization input, providing fault tolerant operation of said oscillator.

8. The circuit of claim 7, wherein said control circuit further comprises a transistor having a drain coupled to said synchronization output and a gate coupled to an output of said oscillator for imposing a state of said oscillator on said synchronization output.

9. The circuit of claim 1, wherein said control circuit is a pulse-width modulator for providing control of energy supplied to said inductor by controlling a pulse width of said switching circuit.

10. The circuit of claim 9, further comprising a sense circuit coupled to said switching circuit, whereby a current through said switching circuit is measured and further coupled to said pulse-width modulator whereby said pulse-width is set in conformity with said measured current.

11. The circuit of claim 10, wherein said pulse width is set in conformity with a deviation of said measured current from a predetermined current level.

12. An integrated circuit controller for supplying a drive current to an external device, said integrated circuit controller having only three external terminals and comprising:
    a first external terminal for supplying an intermittent current to an external circuit comprising a series connected circuit loop comprising said external device, an inductor and a diode circuit, wherein said external circuit is coupled to an external power supply, and wherein operating power for said integrated circuit controller is derived from said external power supply through said first external terminal;
    a second terminal for providing a return path for said intermittent current;

a third terminal for receiving an enable input for activating said external device, wherein said intermittent current is supplied in response to an active level at said enable input;

a switching circuit connected to said first terminal for intermittently applying said intermittent current through said inductor for maintaining a level of energy storage within said inductor; and a control circuit for controlling said switching circuit, whereby said level of energy storage is maintained.

13. A circuit for supplying a drive current through an external device, comprising:

a series connected circuit loop comprising said external device, an inductor for storing energy whereby substantially constant predetermined levels of average current are maintained through said external device and a diode circuit for providing unidirectional flow of current through the inductor when said external current is not applied to said inductor;

a switching circuit for intermittently applying an intermittent current through said inductor for maintaining said substantially constant predetermined levels of average current through said inductor; and a control circuit for controlling said switching circuit, whereby said level of energy storage is maintained, wherein said control circuit is a pulse-width modulator for providing control of energy supplied to said inductor by controlling a pulse width of said switching circuit, and wherein said control circuit has first state for not applying energy to external device, a second state for applying a first level of current to said external device and a third state for applying a second level of current to said external device, and wherein said pulse width is set to predetermined intervals in accordance with said first level and said second level.

14. A circuit for supplying a drive current through an external device, comprising:

a series connected circuit loop comprising said external device, an inductor for storing energy whereby substantially constant predetermined levels of average current are maintained through said external device and a diode circuit for providing unidirectional flow of current through the inductor when said external current is not applied to said inductor;

a switching circuit for intermittently applying an intermittent current through said inductor for maintaining said substantially constant predetermined levels of average current through said inductor;

a control circuit for controlling said switching circuit, whereby said level of energy storage is maintained, wherein said control circuit is a pulse-width modulator for providing control of energy supplied to said inductor by controlling a pulse width of said switching circuit;

a sense circuit coupled to said switching circuit, whereby a current through said switching circuit is measured and further coupled to said pulse-width modulator whereby said pulse-width is set in conformity with said measured current, and wherein said control circuit has first state for not applying energy to said external device, a second state for applying a first level of energy to said external device and a third state for applying a second level of energy to said external device, and wherein said pulse width is set in conformity with a deviation of said measured current from the applied current level associated with the corresponding state.

15. A circuit for supplying a drive current through an external device, comprising:

a series connected circuit loop comprising said external device, an inductor for storing energy whereby substantially constant predetermined levels of average current are maintained through said external device and a diode circuit for providing unidirectional flow of current through the inductor when said external current is not applied to said inductor;

a switching circuit for intermittently applying an intermittent current through said inductor for maintaining said substantially constant predetermined levels of average current through said inductor; and a control circuit for controlling said switching circuit, whereby said level of energy storage is maintained, and wherein said control circuit comprises a synchronization input whereby a pulse-width modulator is synchronized with another external control circuit.

16. The circuit of claim 15, wherein said synchronization input is a bi-directional input/output terminal whereby said control circuit provides a synchronization output for synchronizing external driver circuits.

17. The circuit of claim 16, wherein said control circuit further comprises:

an edge detector having an input coupled to said synchronization input; and an oscillator having a reset input coupled to an output of said edge detector, whereby said oscillator is synchronized with an external clock applied to said synchronization input, and wherein said oscillator will run independent of a fault state of said synchronization input, providing fault tolerant operation of said oscillator.

18. The circuit of claim 17, wherein said control circuit further comprises a transistor having a drain coupled to said synchronization output and a gate coupled to an output of said oscillator for imposing a state of said oscillator on said synchronization output.

19. An integrated circuit controller for supplying a drive current to an external device, comprising:

a first terminal for supplying an intermittent current to an external circuit comprising a series connected circuit loop comprising said external device, an inductor and a diode circuit;

a second terminal for receiving an enable input for activating said external device, wherein said intermittent current is supplied in response to an active level at said enable input;

a switching circuit coupled to said first terminal for intermittently applying said intermittent current for maintaining substantially constant predetermined levels of current within said inductor; and a control circuit for controlling said switching circuit, whereby said substantially constant predetermined levels of current are maintained.

20. The integrated circuit controller of claim 19, wherein said first terminal is a gate control terminal, whereby said first terminal supplies an intermittent current to said inductor by controlling the gate of an external transistor coupled in functional series with said inductor.

21. The integrated circuit controller of claim 19, further comprising a third terminal for connection to an external sensing circuit coupled to said switching circuit, whereby a signal proportional to said intermittent current is supplied to said control circuit for controlling said intermittent current.

22. The integrated circuit controller of claim 19, wherein said control circuit comprises a pulse-width modulator having an output coupled to said switching circuit for controlling said intermittent current.

23. The integrated circuit controller of claim 22, further comprising a sense circuit coupled to said switching circuit, whereby a current through said switching circuit is measured and further coupled to said pulse-width modulator whereby said pulse-width is set in conformity with said measured current.

24. The integrated circuit controller of claim 23, wherein said pulse width is set in conformity with a deviation of said measured current from a predetermined current level.

25. The integrated circuit controller of claim 24, wherein said control circuit has first state for not applying energy to said external device, a second state for applying a first level of energy to said external device and a third state for applying a second level of energy to said external device, and wherein said pulse width is set in conformity with a deviation of said measured current from the applied current level associated with the corresponding state.

26. The integrated circuit controller of claim 19, wherein said control circuit comprises a synchronization input whereby said pulse-width modulator is synchronized with another external control circuit.

27. The integrated circuit controller of claim 26, wherein said synchronization input is a bi-directional input/output terminal whereby said control circuit provides a synchronization output for synchronizing external driver circuits.

28. The integrated circuit controller of claim 27, wherein said control circuit further comprises:

an edge detector having an input coupled to said synchronization input; and an oscillator having a reset input coupled to an output of said edge detector, whereby said oscillator is synchronized with an external clock applied to said synchronization input, and wherein said oscillator will run independent of a fault state of said synchronization input, providing fault tolerant operation of said oscillator.

29. The integrated circuit controller of claim 28, wherein said control circuit further comprises a transistor having a drain coupled to said synchronization output and a gate coupled to an output of said oscillator for imposing a state of said oscillator on said synchronization output.

30. The integrated circuit controller of claim 19, wherein said switching circuit comprises a switching transistor having a gate coupled to an output of said control circuit and having a drain coupled to said first terminal.

31. The integrated circuit controller of claim 19, wherein power for operating internal circuits of said integrated circuit controller and for generating said intermittent current is derived from said first terminal when said switching circuit is not supplying said intermittent current.

32. The integrated circuit controller of claim 19, wherein said control circuit has first state for not applying energy to external device, a second state for applying a first level of current to said external device and a third state for applying a second level of current to said external device, and wherein said pulse width is set to predetermined intervals in accordance with said first level and said second level.

33. An integrated circuit controller for supplying a drive current to an external device, said integrated circuit controller having only two external terminals and comprising:

a first external terminal for supplying an intermittent current to an external circuit comprising a series connected circuit loop comprising said external device, an inductor and a diode circuit, wherein said external circuit is coupled to an external power supply, and wherein operating power for said integrated circuit controller is derived from said external power supply through said first external terminal;

a second terminal for providing a return path for said intermittent current;

a switching circuit connected to said first terminal for intermittently applying said intermittent current through said inductor for maintaining a level of energy storage within said inductor; and a control circuit for controlling said switching circuit, whereby said level of energy storage is maintained.

* * * * *